Patented Mar. 17, 1925.

1,530,280

UNITED STATES PATENT OFFICE.

EMIL MOLZ, OF HALLE-ON-THE-SAALE, GERMANY, ASSIGNOR TO CHEMISCHE FABRIK LUDWIG MEYER, OF MAINZ, GERMANY.

DISINFECTANT AND PROCESS OF PREPARING AND USING THE SAME.

No Drawing.   Application filed May 7, 1924.   Serial No. 711,569.

*To all whom it may concern:*

Be it known that I, Dr. EMIL MOLZ, a citizen of Germany, and a resident of Halle-on-the-Saale, Germany, have invented certain new and useful Improvements in Disinfectants and Processes of Preparing and Using the Same, of which the following is a specification.

The present invention relates to compositions of disinfecting solutions of formaldehyde and its polymers, and to processes of preparing and using the same, particularly such compositions for disinfecting seed, and the invention seeks to improve such disinfectants and processes so as to avoid the harmful corrosive action upon the seed which has heretofore accompanied the use of formaldehyde as a disinfectant for seed.

While formaldehyde is a very efficient disinfectant for seed, its use for this purpose has been accompanied with harmful effects. Müller and Molz (Deutsche Landwirtschaftliche Presse 1919, Nr. 65, S. 491, grosse Tabelle 9–12), and later Zade (Deutsche Landwirtschaftliche Presse 1920, Nr. 27, S. 204), have shown experimentally that it is the corrosive action of the residue of formaldehyde remaining upon the seed grain after evaporation, that causes the damage. Miss Hurd of the United States, (U. S. Department of Agriculture, Research 20, 1920, page 209), has established that the corrosive action is due to the solid precipitation of para-formaldehyde on the outer skin of the seed, after Müller and Molz (Fühlings Landwirtschaftliche Zeitung, 1914, S. 742–752) has shown the very harmful corrosive action of para-formaldehyde upon seed grain.

An attempt has been made to prevent the formation of precipitates in formaldehyde solutions by the addition of methyl alcohol (Meyer and Jacobson, Organische Chemie, Bd. 1, 1907, S. 705). While this method is effective to a certain extent when the solutions are stored in tanks, methyl alcohol cannot prevent the polymerization of formaldehyde during its evaporation from seed grain, since methyl alcohol evaporates more rapidly than formaldehyde. Furthermore, according to Kiessling, (Journal für Landwirtschaft 1918, S. 27), mixtures of this kind have been quite ineffective for the preservation of the germinative power of seed grain.

In accordance with the present invention, halogen acids, and particularly hydrochloric acid and hydrofluoric acid—in a very dilute, aqueous solution are added—to the formaldehyde solution, with of course the formation of halogen derivatives of formaldehyde. Such a preparation is well suited as a disinfectant for seed grain and its use will not be accompanied by a precipitation of para-formaldehyde upon the seed grain during the evaporation of the treating solution, and hence corrosive action upon the seed is avoided.

Preferably the improved disinfectant is prepared by adding hydrochloric acid to formaldehyde and the preferred proportions used are equal parts by volume of a 40% solution of formaldehyde and a 60% solution of hydrochloric acid. The improved preparation can be used alone or admixed with other substances and particularly good results are obtained by adding a small amount of mercuric chloride to increase its disinfecting action.

In use the seed is preferably immersed for a short period, say from one-quarter to one-half an hour, in a very dilute solution (say from one-quarter to one-third of one percent) of the improved disinfectant.

The additions of hydrochloric or hydrofluoric acids to formaldehyde solutions of course form halogen derivatives of formaldehyde, which are effective for the purposes of the present invention. It should also be noted that in place of formaldehyde, various solutions of its polymers may be used. Various substances, f. expl. such as mercuric chloride, may be added to the defined formaldehyde preparations for the purpose of increasing their disinfectant action or for other purposes.

The foregoing formaldehyde preparations can be applied to the seed, and particularly to seed grain, and the added substances will effectively prevent the polymerization of the formaldehyde during evaporation. The improved compositions can thus be effectively employed for disinfecting seed, and particularly seed grain, without subjecting the same to corrosive action. The improved compositions are also of value for application to plants to prevent diseases.

Obviously, changes may be made in the details set forth without departure from the essentials of the invention as defined in the claims.

I claim as my invention:—

1. A disinfecting solution for seed and the like, comprising a halogen derivative of formaldehyde formed by adding a halogen acid to formaldehyde solution, substantially as described.

2. A disinfective solution for seed and the like, prepared by admixing formaldehyde or its polymers and hydrochloric acid, substantially as described.

3. The method of disinfecting seed which consists in treating the same with a solution prepared by admixing formaldehyde or its polymers with hydrochloric acid, substantially as described.

4. The method of disinfecting seed which consists in treating the same with a solution prepared by admixing formaldehyde, hydrochloric acid and mercuric chloride, substantially as described.

5. A disinfectant for seed or the like, prepared by admixing a solution of formaldehyde or its polymers, hydrochloric acid and mercuric chloride, substantially as described.

6. A disinfectant for seed and the like formed of formaldehyde solution, hydrochloric acid and mercuric chloride.

DR. EMIL MOLZ.